(12) United States Patent
Kramer et al.

(10) Patent No.: US 9,139,449 B2
(45) Date of Patent: Sep. 22, 2015

(54) METHOD FOR REDUCING THE CONTENT OF FINE MATERIAL IN FGD GYPSUM

(71) Applicant: ANDRITZ AG, Raaba (AT)

(72) Inventors: Michael Kramer, Graz (AT); Andreas Gruber-Waltl, Graz (AT)

(73) Assignee: ANDRITZ AG, Graz (AT)

( * ) Notice: Subject to any disclaimer, the term of this patent is extended or adjusted under 35 U.S.C. 154(b) by 0 days.

(21) Appl. No.: 14/377,743

(22) PCT Filed: Feb. 8, 2013

(86) PCT No.: PCT/EP2013/000379
§ 371 (c)(1),
(2) Date: Aug. 8, 2014

(87) PCT Pub. No.: WO2013/117341
PCT Pub. Date: Aug. 15, 2013

(65) Prior Publication Data
US 2015/0041374 A1    Feb. 12, 2015

(30) Foreign Application Priority Data

Feb. 10, 2012 (AT) .................................... 176/2012

(51) Int. Cl.
*B04C 5/26* (2006.01)
*B04C 5/30* (2006.01)
(Continued)

(52) U.S. Cl.
CPC .............. *C01F 11/468* (2013.01); *B01D 45/00* (2013.01); *B01D 45/04* (2013.01); *B01D 45/12* (2013.01); *B04C 5/04* (2013.01); *B04C 5/18* (2013.01); *B04C 5/26* (2013.01); *C04B 11/264* (2013.01)

(58) Field of Classification Search
CPC .............. B04C 5/04; B04C 5/12; B04C 5/14; B04C 5/18; B04C 5/24; B04C 5/26; B04C 5/00; B04C 5/02; B04C 5/06; B04C 5/08; B04C 5/081; B04C 5/085; B04C 5/087; B04C 5/10; B04C 5/103; B04C 5/107; B04C 5/13; B01D 45/00; B01D 45/02; B01D 45/04; B01D 45/06; B01D 45/08; B01D 45/10; B01D 45/12; B01D 45/14; B01D 45/16; B01D 21/265; B01D 21/267; B01D 21/269; B01D 21/26; B01D 17/0217; B01D 21/2411; B04B 5/0428; B01L 3/5021; B01L 3/50215; G01N 33/491; C02F 1/38
USPC ........... 209/155, 729, 731; 406/173; 210/787, 210/788, 789
See application file for complete search history.

(56) References Cited

U.S. PATENT DOCUMENTS 3,507,397 A    4/1970   Robinson
4,652,363 A    3/1987   Miller
(Continued)

FOREIGN PATENT DOCUMENTS

DE      4034497       2/1992
DE      19652482      6/1998
(Continued)

OTHER PUBLICATIONS

International Search Report for PCT/EP2013/000379, English translation attached to original, Both completed by the European Patent office on May 27, 2013, All together 7 Pages.

*Primary Examiner* — Jeffrey Shapiro
(74) *Attorney, Agent, or Firm* — Brooks Kushman P.C.

(57) ABSTRACT

A method for obtaining gypsum using a flue-gas desulfurization system (FGD) having a gypsum suspension, which includes fine materials such as active carbon particles or residual carbonate particles for example, accumulates in the scrubber of a wet flue gas scrubber. The gypsum-containing suspension is thickened by at least one hydrocyclone, and the thickened gypsum suspension is discharged via the underflow of the hydrocyclone. Water is fed to the hydrocyclone in addition to the gypsum suspension via a dedicated feed line such that the content of fine material is thus reduced with respect to the suspension volume in the underflow.

9 Claims, 4 Drawing Sheets

(51) Int. Cl.

| | |
|---|---|
| *C01F 11/46* | (2006.01) |
| *B01D 45/04* | (2006.01) |
| *B01D 45/12* | (2006.01) |
| *B01D 45/00* | (2006.01) |
| *B04C 5/04* | (2006.01) |
| *B04C 5/18* | (2006.01) |
| *C04B 11/26* | (2006.01) |

(56) References Cited

U.S. PATENT DOCUMENTS

| | | |
|---|---|---|
| 4,696,737 A | 9/1987 | Bouchillon |
| 4,969,934 A | 11/1990 | Kusik et al. |
| 5,308,509 A | 5/1994 | Bhat et al. |
| 5,500,197 A | 3/1996 | Grone |
| 6,284,096 B1 | 9/2001 | Hartmann |
| 7,727,307 B2 | 6/2010 | Winkler |
| 2003/0175193 A1* | 9/2003 | Schultz et al. ............ 423/243.08 |
| 2006/0045801 A1* | 3/2006 | Boyden et al. .................. 422/62 |
| 2006/0112824 A1* | 6/2006 | Seida et al. ...................... 95/195 |
| 2008/0044332 A1* | 2/2008 | Rader et al. .................... 423/220 |
| 2009/0162269 A1* | 6/2009 | Barger et al. ................ 423/215.5 |
| 2010/0111777 A1* | 5/2010 | Klingspor et al. ............. 422/168 |

FOREIGN PATENT DOCUMENTS

| | | |
|---|---|---|
| DE | 102009057079 | 8/2010 |
| EP | 1069234 | 5/2004 |
| EP | 2033702 | 3/2009 |
| FR | 2629371 | 10/1989 |
| WO | 2010089309 | 8/2010 |

* cited by examiner

METHOD FOR REDUCING THE CONTENT OF FINE MATERIAL IN FGD GYPSUM

CROSS-REFERENCE TO RELATED APPLICATION

This application is the U.S. national phase of PCT Application No. PCT/EP2013/000379 filed on Feb. 08, 2013, which claims priority to AT Patent Application No. A 176/2012 filed on Feb. 10, 2012, the disclosures of which are incorporated in their entirety by reference herein.

The subject of this invention is a method for the recovery of gypsum with the aid of a flue gas desulfurization plant (FGD), a gypsum suspension, which also contains fine materials, such as, for example, activated charcoal particles or residual carbonate particles, occurring in the scrubber of the wet flue gas scrub, and the gypsum-containing suspension being thickened by means of at least one hydrocyclone, and the thickened gypsum suspension being discharged via the underflow of the hydrocyclone.

Flue gas desulfurization is a method for the removal of sulfur compounds from the exhaust gases of, for example, power stations, garbage incineration plants or large engines. The sulfur compounds arise in this case as a result of the combustion of sulfurous, mostly fossil fuels. The plants for flue gas desulfurization are abbreviated to FGD (flue gas desulfurization plant). A flue gas desulfurization plant may also be used for the recovery of gypsum (FGD gypsum). This type of gypsum recovery has already been state of the art for a long time.

The wash suspension (gypsum suspension) employed in desulfurization is thickened by means of hydrocyclones according to the present-day state of the art and is subsequently brought to the final dry content via band filters or a centrifuge. In the past, pre-dewatering in the cyclone only had to satisfy the requirement of adhering to the stipulated solid contents and to the stipulated mass flows of the solids. Accordingly, only simple cyclones were used, which were enhanced to the required parameters by adapting the main dimensions (cyclone diameter and length), underflow nozzle diameter and immersion tube diameter and also process management (stipulation of the solid contents in the inflow, fixing the inflow/overflow differential pressure). There were no special requirements with regard to the separation of special fine material fractions.

The gypsum quality normally has to satisfy requirements as to degree of purity. The content of $CaSO_4 \cdot 2H_2O$ should mostly not undershoot 95% (see, in this respect, also the instructions of EUROGYPSUM). These requirements tend to become ever more stringent. For this reason, the set object is to seek an adapted method which makes it possible to influence the impurities (mostly fine materials) in the underflow to a greater extent than is the case with the plant circuits conventional today. What are deemed impurities are, in particular, inerts, soot and residual carbonate, which may be introduced via the absorbent or else via fly ash. What these impurities have in common is that they are usually somewhat finer-grained than the gypsum formed.

Moreover, the idea has recently been to introduce a limit value for the load of mercury to in FGD gypsum. This is important particularly with a view to the stabilization of mercury in the scrubber, because, in current methods, mercury enrichment in the administered (adsorptive) fine-grained phase (for example, activated charcoal, described in EP2033702A1) is mostly observed. However, the enrichment of a particle fraction unavoidably leads to the increased mercury values in the dewatered gypsum.

If a precipitant is used instead of an adsorbent in order to stabilize the dissolved heavy metal (for example TMT15, see also EP2033702A1), this is deposited, in particular, on the fine and finest fraction. Directed separation is not possible by means of a centrifugal purification assembly (hydrocyclone, centrifuge).

A hydrocyclone is composed, as a rule, of a cylindrical segment with a tangential inflow (inflow nozzle) and with a conical segment adjoining the latter and having the underflow nozzle or apex nozzle. The vortex finder or the overflow nozzle projects in the form of an immersion tube axially into the interior of the cyclone from above.

As a result of the tangential inflow into the cylindrical segment, the liquid is forced along a circular path and flows downward in a downwardly directed vortex. The taper in the conical segment results in an inward displacement of volume and in a build-up in the lower region of the cone. This leads to the formation of an inner upwardly directed vortex which is discharged through the overflow nozzle. The aim is the separation of the specifically heavier fraction (for example, solids) on the wall of the cyclone and therefore the discharge through the underflow nozzle, while the specifically lighter fraction escapes through the overflow nozzle. The thickened stream discharged at the bottom is called the underflow and the upwardly discharged stream greatly freed of solids is designated as the overflow or top flow.

The designations "top" and "bottom" arise in the present description from the underflow (specifically heavier or coarser fraction) and from the overflow (specifically lighter or finer fraction). However, the actual position of the hydrocyclone is to the greatest possible extent independent of this, thus even horizontally installed hydrocyclones can be used perfectly well.

The fundamental principle of the separating and grading effect of a hydrocyclone is described by the interaction of the centrifugal and flow forces. Whereas the centrifugal force acts to a greater extent on large particles of high density (coarse materials) and these are therefore separated outwardly to the cyclone wall, in the case of small particles, on account of their higher specific surface, the force of the flow upon the particles (resistance force) is of major importance. The specifically heavier coarse fraction is enriched in the underflow and the fine-grained and/or light fraction is drawn off in the overflow.

It follows from this that very small particles (fine material fraction) cannot be significantly enriched or depleted (related to volume) by means of current hydrocyclones, because they behave in a similar way to a solution. The division of the fine material fraction therefore mostly corresponds only to the volumetric split between the overflow and underflow.

On account of the interrelationships mentioned for a current hydrocyclone (or, in general, for a separation apparatus based on centrifugal force), the effective separation of a fine fraction from the underflow cannot be expected. Only an accumulation of coarse materials in the underflow in relation to volume is possible, along with a depletion of the coarse materials in the overflow.

When centrifugal force grading is carried out, therefore, a fraction of fine materials which corresponds to the drawn-off volume always passes into the underflow. In the subsequent dewatering step, for example by means of band filters or centrifuges, these fine materials may no longer be separated even by means of a gypsum scrub. The gypsum dewatered in this way will therefore no longer comply with the ever more stringent requirements.

In order to reduce the disturbing fine material fractions in the underflow, it is possible, in principle, to use multistage cyclone circuits with intermediate dilution between the individual hydrocyclones. However, these plants, as disclosed, for example, in DE 40 34 497 C1, are complicated to install and sometimes cannot be implemented in terms of the water balance, since the demand for diluting water is too high.

Hence, for all the uses mentioned, the set object is to separate an underflow which is as free as possible of fine material by means of centrifugal force separation, whereby the plant should have as simple a set-up as possible.

This object is achieved by means of a method for the recovery of gypsum, in which water is supplied to the centrifugal force separator (hydrocyclone, centrifuge or the like) via a dedicated supply line in addition to the gypsum suspension, thereby resulting in fine material depletion, in relation to the suspension volume, in the underflow.

Depletion may take place specifically (by the displacement of the continuous phase or by the introduction of a separating layer for coarse/fine materials) or nonspecifically by the metering of diluting water in the cyclone.

The pre-dewatering of the gypsum suspension therefore takes place in such a way that only cyclones are used which bring about a reduction (depletion) of the fine materials in the underflow (in relation to the content of fine material in the inflow).

Depletion of the fine material fraction in the underflow may take place in the simplest way by means of simple intermediate dilution within a cyclone or by the displacement of the liquid phase in the underflow as a result of directed metering of a stream of washing water. WO 2010/089309 A1 speaks in this respect of countercurrent grading. However, intermediate dilution must take place by means of a fluid stream which does not contain the problematic fraction.

According to the invention, the water is administered in the inflow region or in the conical region of the hydrocyclone as a barrier water stream to form a barrier water layer, the barrier water stream and the gypsum suspension being separated in the hydrocyclone by a lamella until the barrier water flow and gypsum suspension flow have become essentially stable.

It is also advantageous if the hydrocyclone has a cylindrical inflow region and a conical region.

The additional administration of this barrier water stream causes the introduction into the cyclone of a pure sedimentation layer, by means of which the heavy particles are separated, but fine fractions (fine materials) remain predominantly in the core flow. The barrier water flow in this case surrounds the gypsum suspension in the form of a ring. The fine material or the fine grain are therefore depleted in the underflow with respect to the volume-related concentration in the inflow.

As a result, a heavy particle fraction which has a markedly reduced fine particle fraction is obtained in the underflow. Preferably, the barrier water layer and the gypsum suspension are separated from one another by a cylindrical or conical lamella arranged in the cylindrical segment or in the conical region.

It is beneficial if the barrier water layer and the gypsum suspension are led further on together in the hydrocyclone as soon as the barrier water flow and gypsum suspension flow have become essentially stable (no longer any minor intermixing).

Preferably, the water is supplied to the hydrocyclone tangentially. Thus, for example, a stable circular barrier water flow can be formed inside the cyclone.

It is also conceivable that the gypsum-containing suspension is thickened by means of two or more hydrocyclones connected in series, water being supplied to the hydrocyclones in each case via a dedicated supply line, thereby resulting in fine material depletion in the underflow in relation to the inflow to the first stage. Moreover, in multistage versions, dilution between the cyclone stages is beneficial.

Two exemplary embodiments of the method according to the invention are described below by means of four drawings in which.

The same reference symbols in the respective drawings designate in each case the same components.

Figure 1:
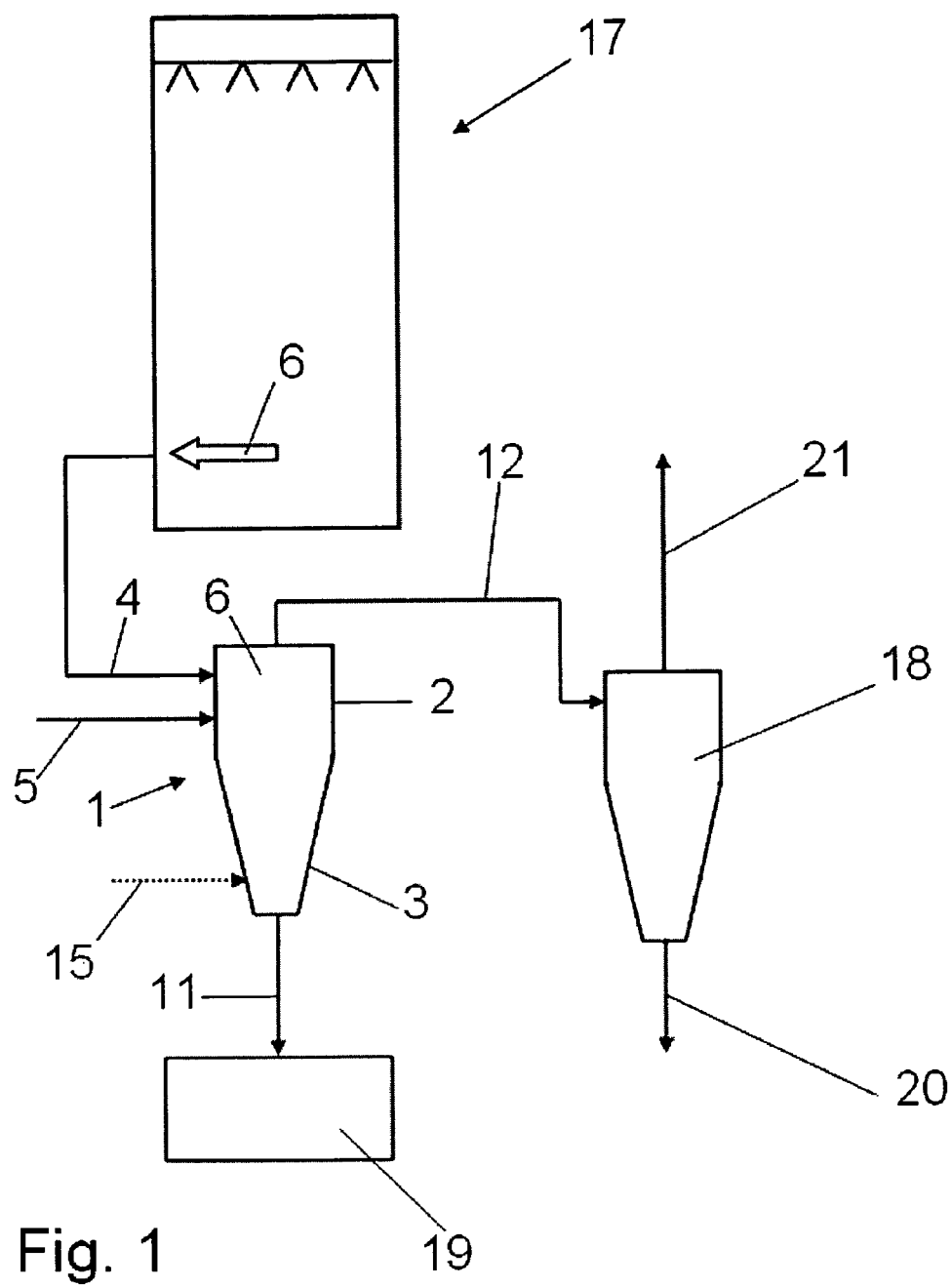
FIG. 1 shows a method diagram for a possible exemplary embodiment of the method according to the invention.

FIG. 1 illustrates a possible method diagram for the method according to the invention for gypsum recovery. The gypsum suspension 6 in this case occurs in a way known per se in the scrubber 17 of a flue gas desulfurization plant (FGD). The gypsum suspension 6 is thickened with the aid of a hydrocyclone 1. For this purpose, the gypsum suspension 6 is supplied to the hydrocyclone 1 via a tangential inflow 4. The hydrocyclone 1 is composed of a cylindrical inflow region 2 and of a conical region 3. The thickened gypsum suspension 6 is extracted from the hydrocyclone via the underflow 11. The specifically lighter fraction, predominately water, but also fine materials, is discharged as the overflow 12. The overflow 12 is then supplied to a wastewater cyclone 18 and is likewise divided there in a known way into the underflow 20 and overflow 21. The underflow 20 can then be supplied to the flue gas desulfurization plant again, and the overflow 21 is usually supplied to a wastewater treatment plant.

The thickened gypsum suspension 6 from the underflow 11 is supplied to further dewatering assemblies or drying assemblies, such as, for example, a belt drier 19. For the depletion of the fine materials in the underflow 11, water (5, 15) is supplied to the hydrocyclone 1. This may be a supply of a barrier water stream 5 in the inflow region 2 of the hydrocyclone 1 (see FIG. 3) or else an additional supply of diluting water 15 in the conical region 3 or in the region of the underflow 11 (see FIG. 4). The fine materials may be, for example, activated charcoal particles, which are often laden with mercury, or else residual carbonate particles, inerts or fly ash.

Figure 2:
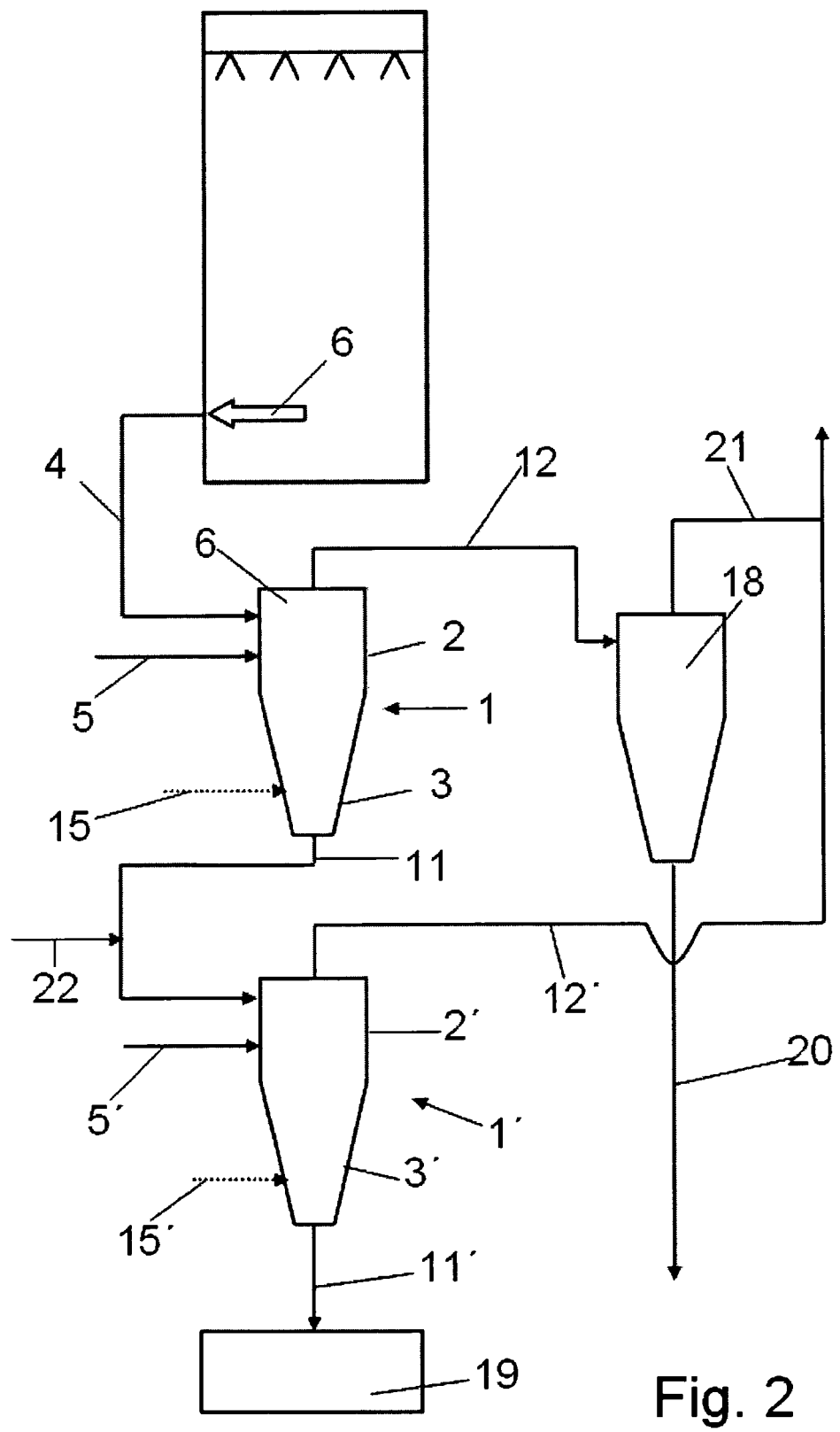
FIG. 2 shows a method diagram for a further exemplary embodiment of the method according to the invention.

In FIG. 2, to thicken the gypsum suspension 6, two hydrocyclones 1, 1' are connected in series. The underflow 11 from the first hydrocyclone 1 in this case forms the inflow to the second hydrocyclone 1'. The second hydrocyclone 1' likewise has a cylindrical inflow region 2', a conical region 3' and likewise a water supply 5' and 15'. The thickened gypsum suspension 6 from the underflow 11' of the second hydrocyclone 1' is then supplied to a belt drier 19. The overflow 12' of the second hydrocyclone 1' may be combined with the overflow 21 of the wastewater cyclone 18. Between the two hydrocyclones 1 and 1', diluting water 22 may optionally be supplied for intermediate dilution.

Figure 3:
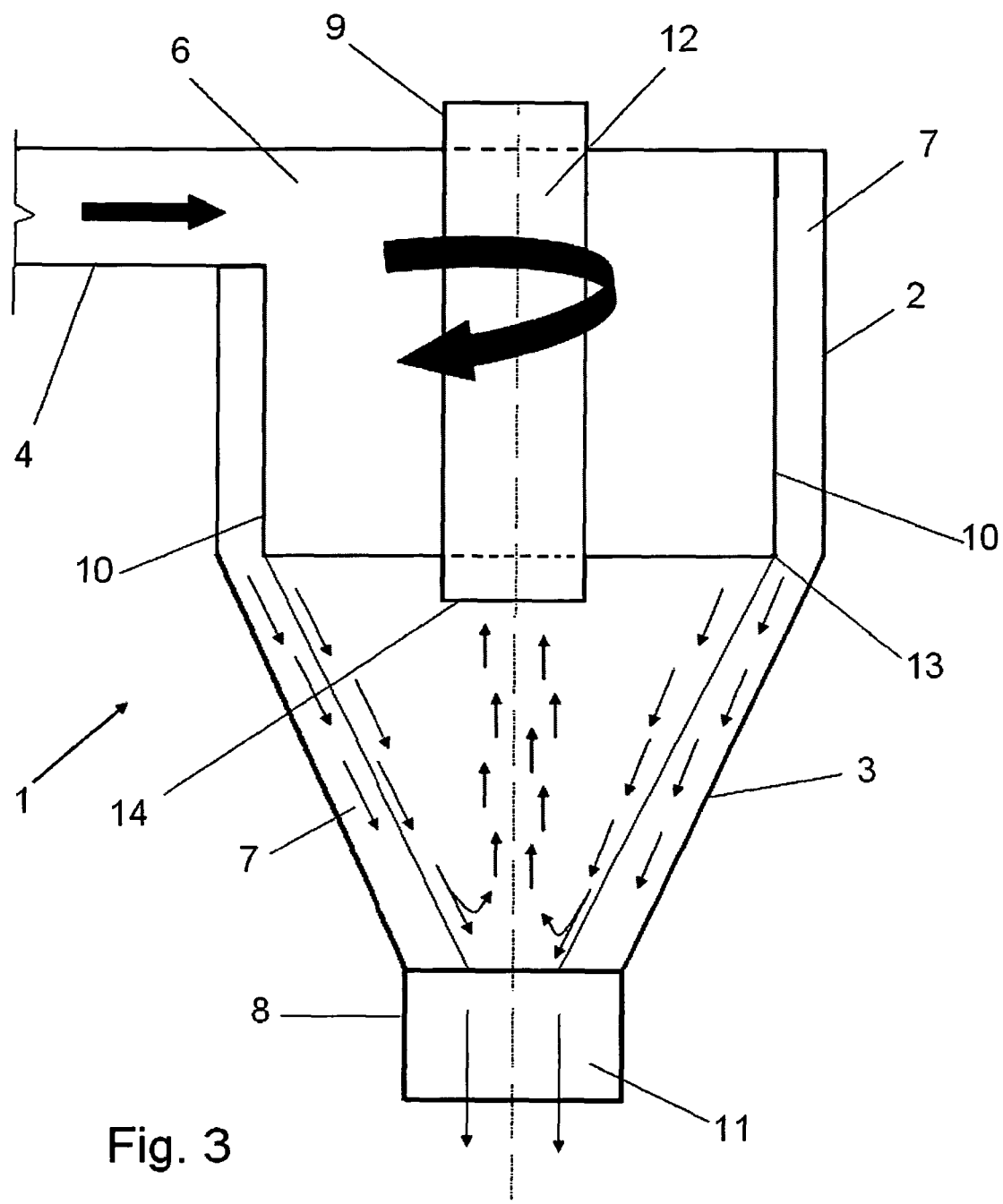
FIG. 3 shows an exemplary embodiment of a hydrocyclone suitable for the method according to the invention.

FIG. 3 illustrates by way of example an embodiment of a hydrocyclone 1 or 1' which is suitable for the method according to the invention. It is composed of a cylindrical inflow region 2 and of a conical region 3 adjoining the latter. The gypsum suspension 6 is supplied to the hydrocyclone 1 via the tangential inflow 4. The conical region 3 has an underflow nozzle 8 for discharging the underflow 11, that is to say the thickened gypsum suspension 6. The specifically lighter fraction, that is to say the overflow 12, can be discharged through the overflow nozzle 9 which projects in the form of an immersion tube axially into the interior of the hydrocyclone 1.

In addition to the tangential inflow 4, the hydrocyclone 1 also has a further inflow for a barrier water stream 5 which here is likewise supplied tangentially to the cylindrical segment 2. In FIG. 3, it runs parallel to the tangential inflow 4 and is therefore concealed by this. The barrier water layer 7 and the gypsum suspension 6 are supplied separately to the hydrocyclone 1 and are separated from one another by the lamella 10. The lamella 10 is, for example, a cylindrical thin-walled component made from metal. The pure barrier water layer 7 meets the actual gypsum suspension 6 at the lower end 13 of the lamella 10. This takes place as soon as the flows of barrier water 7 and gypsum suspension 6 have become stable. The mouth orifice 14 of the overflow nozzle 9 ends here, for example, in the region below the end 13 of the lamella 10.

After the two volumetric flows 7, 6 have been combined, a settling movement of heavy particles (gypsum) through the barrier layer 7 commences. This results in a depletion of the fine materials in the underflow 11. Flow routing in the conical segment 3 takes place as in conventional hydrocyclones.

The flow arrows indicate that the barrier water flow 7 and the gypsum suspension 6 are intermixed with one another as little as possible. The barrier water flow 7 therefore forms with respect to the wall of the conical segment 3 a barrier water layer 7.

Optionally, washing or diluting water may additionally be introduced in the conical segment 3 or in the underflow region, and as result of this the volume-related fraction of the fine materials in the underflow 11 can be further reduced. It is also conceivable to introduce a water stream to feed the vortex in order to prevent coarse material particles from being swirled up again.

Figure 4:
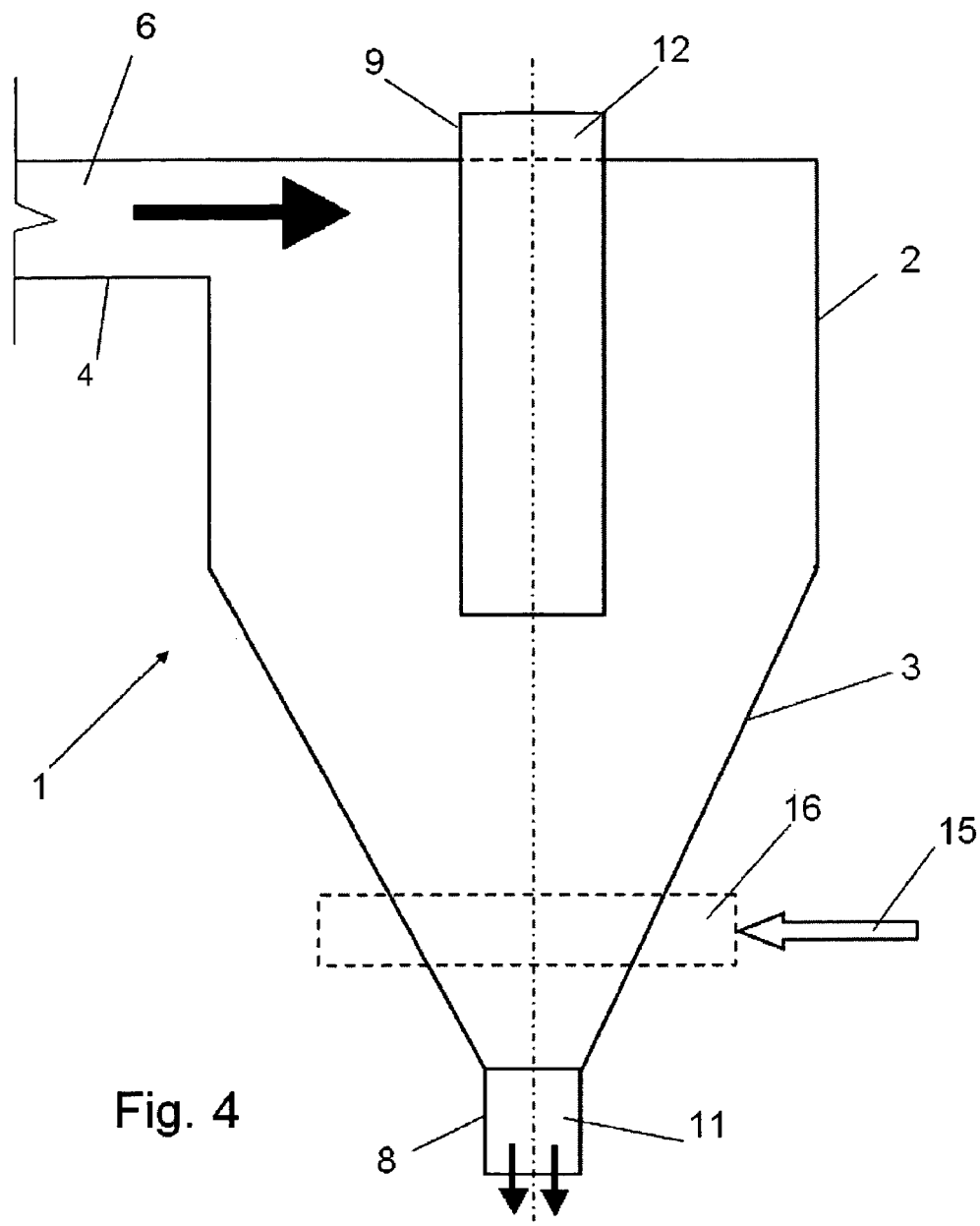
FIG. 4 shows an exemplary embodiment of a hydrocyclone not according to the invention.

FIG. 4 illustrates a hydrocyclone 1 or 1' which is not according to the invention. This hydrocyclone 1 has a cylindrical inflow region 2, a conical region 3, an underflow nozzle 8 for discharging the underflow 11 and an overflow nozzle 9 for discharging the overflow 12. In this hydrocyclone 1, diluting water 15 is supplied in the conical region 3 or in the underflow region, specifically via the water distributor 16, by means of which the diluting water 15 is supplied tangentially to the gypsum suspension 6. The directed supply of the diluting water 15 by the water distributor 16 causes the crosscurrent grading given in hydrocyclone 1 to be superposed with a countercurrent grading. In this case, a radial flow directed toward the center is generated in the centrifugal field of the hydrocyclone 1 by the diluting water 15. This directed diluting water addition 15 results in a reduction of fine material (fine grain) in the underflow 11. The water distributor 16 comprises, for example, a multiplicity of bores which issue in the form of a ring into the conical region 3 or into the region of the underflow nozzle 8 and which thus mix the diluting water 15 into the gypsum suspension 6 in a uniform distribution over the outer wall of the hydrocyclone 1. The embodiments illustrated in the drawings constitute merely a preferred version of the invention. The invention also embraces other embodiments in which, for example, a plurality of further inflows for the barrier water 5, 5' or for the diluting water 15, 15' are provided.

The invention claimed is:

1. A method for the recovery of gypsum with the aid of a flue gas desulfurization plant, a gypsum suspension, which also contains fine material occurring in the scrubber of a wet flue gas scrub, and the gypsum-containing suspension being thickened by means of at least one hydrocyclone, and the thickened gypsum suspension being discharged via the underflow of the hydrocyclone, wherein water is supplied to the hydrocyclone via a dedicated supply line in addition to the gypsum suspension, thereby resulting in the fine material depletion in relation to the suspension volume in the underflow, the water being administered in the inflow region or in the conical region of the hydrocyclone as a barrier water stream to form a barrier water layer, and the barrier water stream and the gypsum suspension being separated in the hydrocyclone by a lamella until the barrier water flow and gypsum suspension flow have become essentially stable.

2. The method as claimed in claim 1, wherein the hydrocyclone has a cylindrical inflow region and a conical region, the barrier water stream being supplied in the inflow region, and water being supplied additionally in the conical region or in the region of the underflow nozzle as diluting water for the intermediate dilution of the gypsum suspension.

3. The method as claimed in claim 1, wherein the hydrocyclone has only one conical region, and in that water is additionally supplied in the conical region or in the region of the underflow nozzle as diluting water for the intermediate dilution of the gypsum suspension.

4. The method as claimed in claim 1, wherein the hydrocyclone has a cylindrical inflow region and a conical region.

5. The method as claimed in claim 1, wherein the hydrocyclone has only one conical region.

6. The method as claimed in claim 1, wherein the water is supplied to the hydrocyclone tangentially.

7. The method as claimed in claim 1, wherein the gypsum-containing suspension is thickened by means of two or more hydrocyclones connected in series, water being supplied to the hydrocyclones in each case via a dedicated supply line, thereby resulting in the fine material depletion in relation to the suspension volume in the respective underflow.

8. The method of claim 1, wherein the fine material comprises activated charcoal particles.

9. The method of claim 1, wherein the fine material comprises residual carbonate particles.

* * * * *